United States Patent [19]

Zygutis

[11] Patent Number: 4,833,814
[45] Date of Patent: May 30, 1989

[54] FINGER-GUARDED FISH HOOK SHEATH
[76] Inventor: Larry Zygutis, 2434 S. 11th Ave., Phoenix, Ariz. 85007
[21] Appl. No.: 40,098
[22] Filed: Apr. 20, 1987
[51] Int. Cl.⁴ .............................................. A01K 83/00
[52] U.S. Cl. ..................................................... 43/43.2
[58] Field of Search .................... 43/43.2, 42.4, 42.42; 264/297.2, 297.8; 29/433; D22/144; 63/2

[56] References Cited

U.S. PATENT DOCUMENTS

| | | | |
|---|---|---|---|
| D. 167,803 | 9/1952 | Miller | D22/144 |
| 2,775,060 | 12/1956 | Barker | 43/43.2 |
| 3,825,643 | 7/1974 | Hillier | 264/297.8 |
| 4,311,149 | 1/1982 | Panicci | 63/2 |
| 4,614,054 | 9/1986 | Fovenyessy | 43/43.2 |

FOREIGN PATENT DOCUMENTS 1901903 8/1970 Fed. Rep. of Germany ... 264/297.8

Primary Examiner—Gene P. Crosby
Attorney, Agent, or Firm—Robert A. Hirschfeld

[57] ABSTRACT

A Finger Guarded Fish Hook Sheath has adjacent the hook insertion aperture a finger guard which isolates the aperture region from the region grasped by the user's fingers. The guard has one or more holes suitable for stringing sheaths together. Multiple sheaths are injection molded, joined by injection sprues which continue to link the sheaths when delivered to the user. The user may, at his option, retain the linked structure or separate sheaths for individual usage.

8 Claims, 1 Drawing Sheet

FINGER-GUARDED FISH HOOK SHEATH

TECHNICAL FIELD

The invention relates to sheaths for protecting fish-hooks in tackle boxes and the like.

The invention relates more particularly to sheaths for fish-hooks which prevent inadvertent grasping of the points of the hook.

PRIOR ART

In the past, sheaths for fish-hooks were prone to the user's fingers inadvertently sliding when grasping the sheath for hook removal, such that one or more sharp hook point or prong could puncture the finger.

Individual prior-art sheaths for fish-hooks were easily mislaid.

It is therefore an object of the invention to provide a Finger Guarded Fish Hook Sheath in which the user's finger cannot inadvertently slide to a position of contact with the fish hook prongs or points upon withdrawal of the hook from the sheath.

Another object of the invention is to provide a Finger Guarded Fish Hook Sheath having means for stringing or connecting multiple sheaths together for easy and neat storage.

A further object of the invention is to provide a Finger Guarded Fish Hook Sheath wherein multiple sheaths are economically manufactured together and remain joined in use, or at the user's option, separated by cutting apart.

DISCLOSURE OF THE INVENTION

A Finger Guarded Fish Hook Sheath has adjacent the hook insertion aperture a finger guard which isolates the aperture region from the region grasped by the user's fingers. The guard has one or more holes suitable for stringing sheaths together. Multiple sheaths are injection molded, joined by injection sprues which continue to link the sheaths when delivered to the user. The user may, at his option, retain the linked structure or separate sheaths for individual usage.

BEST MODE FOR CARRYING OUT THE INVENTION

Figure 1:
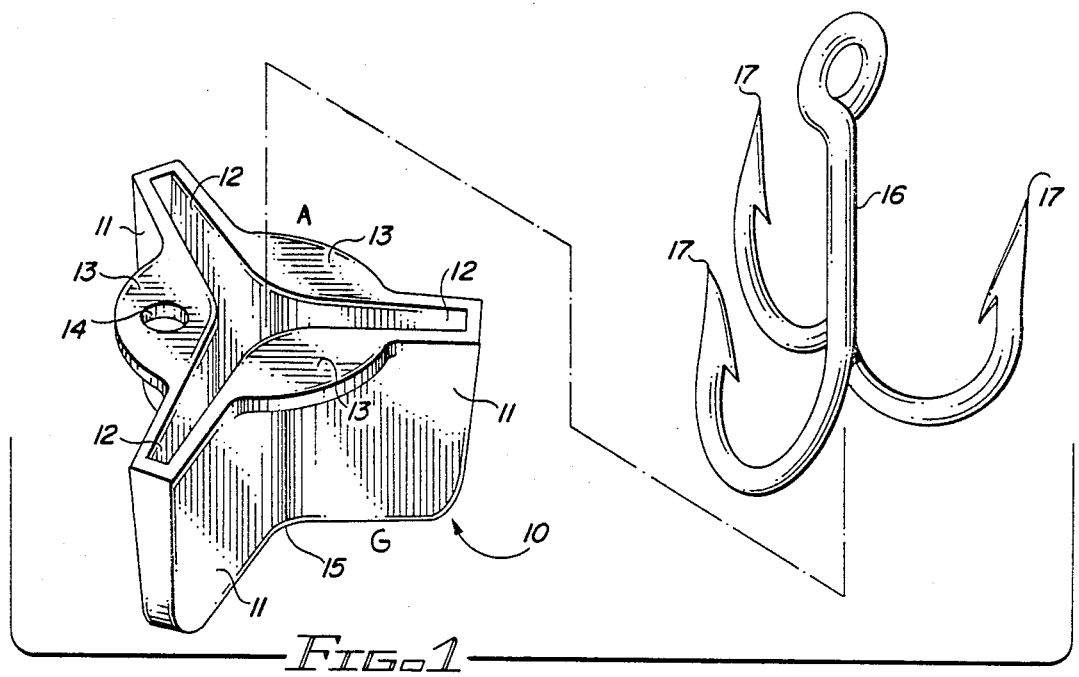
FIG. 1 is a perspective view of the Finger Guarded Fish Hook Sheath showing insertion aperture and a typical fish hook.

For the purposes of promoting an understanding of the principles of the invention, reference will now be made to the embodiments illustrated in the drawings. Specific language will be used to describe the same. It will, nevertheless, be understood that no limitation of the scope of the invention is thereby intended, such alterations and further modifications in the illustrated device; and such further applications of the principles of the invention as illustrated herein being contemplated as would normally occur to one skilled in the art to which the invention relates.

The Finger Guarded Fish Hook Sheath is generally referred to as number 10. In FIG. 1, an aperture end is designated A, and a grasping end designated G. The embodiment shown in the drawings accepts insertion of a treble fish hook 16 having sharpened points 17, although it should be understood that variants accommodating fish hooks 16 having a greater or lesser number of points 17 are herein contemplated.

The user ordinarily grasps sheaths 11 with the fingers of one hand, while inserting with the other hand a fish hook 16 through apertures 12 also referred to as aperture openings 12 adjacent aperture end A, into shield bodies 11. Aperture openings 12 define an aperture plane (not separately numbered). A prior art fish hook sheath (not shown) which lacks web 13, permits the user's fingers to inadvertently extend from grasping end G to beyond the aperture plane defined by aperture opening 12 adjacent aperture end A. When withdrawing a fish hook from the aperture opening 12 of a prior art fish hook sheath, it may be seen that the user's fingers can come in contact with and be punctured by hook points 17.

In the illustrated improvement, however, web 13, also referred to as finger guard 13, defines a maximum locus (transverse web 13 from aperture end A) of the user's fingertips on the grasping portion 15 of sheath 10, said locus away from the points 17 as they emerge from aperture opening 12.

Hole 14, also designated eye 14, through web 13 provides a convenient way to string or tie a plurality of shields together for storage and transport.

Figure 2:
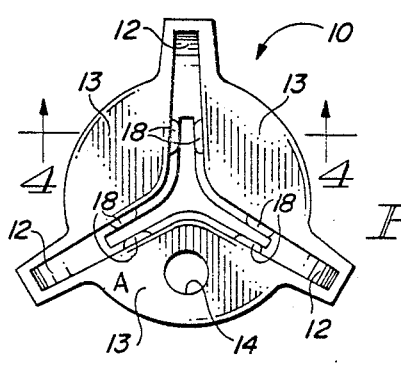
FIG. 2 is an aperture-end view of the Finger Guarded Fish Hook Sheath of FIG. 1.

FIG. 2 shows an aperture-end (end A) view of shield 10, wherein may be seen hook-retaining dimples 18 within shield bodies 11, as is known in the art.

Figure 3:
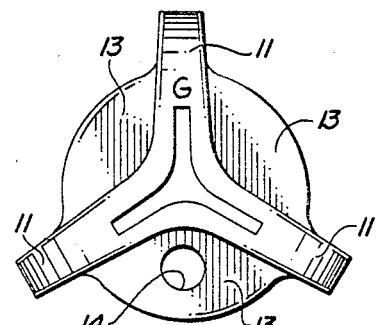
FIG. 3 is a grasping-end view of the Finger Guarded Fish Hook Sheath of FIG. 1.

FIG. 3 is the grasping-end (end G) view of shield 10, as seen by a user who grasps shield bodies 11 between two or three fingers.

Figure 4:
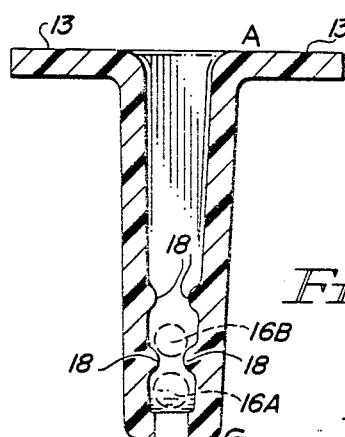
FIG. 4 is a side sectional view of the Finger Guarded Fish Hook Sheath along section 4—4 of FIG. 2.

FIG. 4 illustrates how hooks 16 of various dimensions are accommodated by variously located dimples 18 at loci 16A, 16B.

Figure 5:
FIG. 5 illustrates several Finger Guarded Fish Hook Sheaths interconnected by string.

In FIG. 5, a plurality of shields are strung together by passing string, wire, filament, line or a like thin element 19 through succeeding holes 14.

Figure 6:
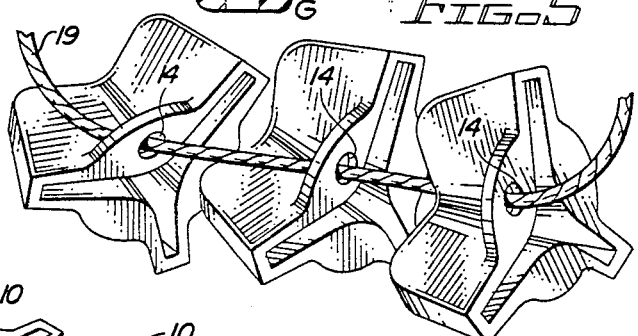
FIG. 6 shows several Finger Guarded Fish Hook Sheaths interconnected by injection molding sprues.
Figure 6:
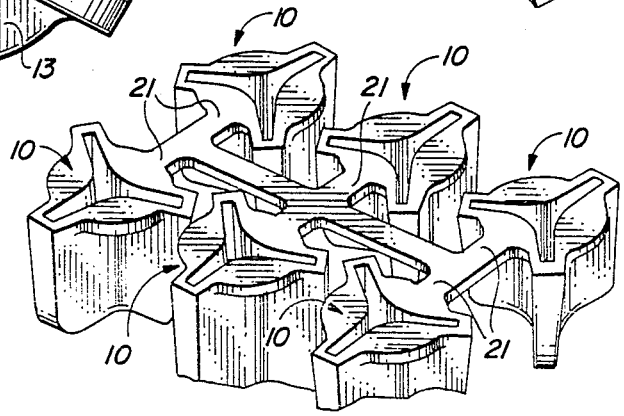

FIG. 6 shows a plurality of shields 10 as seen in FIG. 1 interconnected by sprues 21. In manufacture, sprues 21 may be used as the injection locus in a multiple-shield mold (not shown, but known in the art) to conduct the material comprising the shields from a central injection point to the respective mold cavities.

The sprue-connected structure shown in FIG. 6 comprises a convenient, multi-shield array for holding a plurality of fish hooks neatly and easily accessible. The user, who may purchase such sprue-connected structure, may choose to sever and individually use the shields, or use them as an array.

Those skilled in the art will readily derive other embodiments of the invention drawn from the teachings herein. To the extent that such alternative embodiments are so drawn, it is intended that they shall fall within the ambit of protection provided by the claims appended hereto.

Having described my invention in the foregoing specification and the accompanying drawings in such a clear and concise manner that those skilled in the art may readily understand and easily practice the invention,

I claim:

1. In a Fish Hook Sheath defining a grasping end and an aperture end, said aperture end having an aperture opening for insertion of the sharpened portion of a fish hook, the improvement comprising:

finger Guard means coupled to said Fish Hook Sheath for isolating a user's fingers adjacent said grasping end from said aperture end;

wherein said aperture opening defines an aperture plane, said Finger Guard means comprising web means, said web means being parallel said aperture plane, said web means defining a finger guard between said aperture and said grasping end.

2. In a Fish Hook Sheath defining a grasping end and an aperture end, said aperture end having an aperture opening for insertion of the sharpened portion of a fish hook, the improvement comprising:

finger Guard means coupled to said Fish Hook Sheath for isolating a user's fingers adjacent said grasping end from said aperture end;

further comprising at least one eye means for stringing together of a plurality of said Finger Guarded Fish Hook Sheaths by passage of string through the said eye means of each one of said plurality of Finger Guarded Fish Hook Sheaths;

wherein said finger guard means includes web means, said web means having a widened portion to accommodate a hole as said eye means in said web means.

3. In a Fish Hook Sheath defining a grasping end and an aperture end, said aperture end having an aperture opening for insertion of the sharpened portion of a fish hook, the improvement comprising:

finger Guard means coupled to said Fish Hook Sheath for isolating a user's fingers adjacent said grasping end from said aperture end, wherein said aperture opening defines an aperture plane, said Finger Guard means comprising web means, said web means being parallel to said aperture plane, said web means defining a finger guard between said aperture opening and said grasping end.

4. The Finger Guarded Fish Hook Sheath of claim 3 further comprising at least one eye means for stringing together of a plurality of said Finger Guarded Fish Hook Sheaths by passage of string through the said eye means of each one of said plurality of Finger Guarded Fish Hook Sheaths.

5. The Finger Guarded Fish Hook Sheath of claim 4 wherein said eye means comprises a hole in said web means.

6. The Finger Guarded Fish Hook Sheath of claim 3 wherein a plurality of said Finger Guarded Fish Hook Sheaths are linked by sprue means.

7. In a Fish Hook Sheath defining a grasping end and an aperture end, said aperture end having an aperture opening for insertion of the sharpened portion of a fish hook, the improvement comprising:

finger Guard means coupled to said Fish Hook Sheath for isolating a user's fingers adjacent said grasping end from said aperture end, wherein said aperture opening defines an aperture plane, said finger Guard means comprising web means, said web means being parallel to said aperture plane, said web means defining a finger guard between said aperture opening and said grasping end; and at least one eye means for stringing together of a plurality of said Finger Guarded Fish Hook Sheaths by passage of string through the said eye means of each one of said plurality of Finger Guarded Fish Hook Sheaths;

wherein said eye means comprises a hole in said web means;

wherein a plurality of said Finger Guarded Fish Hook Sheaths are linked by sprue means.

8. In a Fish Hook Sheath defining a grasping end and an aperture end, said aperture end having an aperture opening for insertion of the sharpened portion of a fish hook, the improvement comprising:

finger Guard means coupled to said Fish Hook Sheath for isolating a user's fingers adjacent said grasping end from said aperture end, wherein said aperture opening defines an aperture plane, said Finger Guard means comprising web means, said web means being parallel to said aperture plane, said web means defining a finger guard between said aperture opening and said grasping end;

said Fish Hook Sheath further comprising at least one eye means for stringing together of a plurality of said Finger Guarded Fish Hook Sheaths, wherein said eye means comprises a hole in said web means.

* * * * *